(12) United States Patent
McSheffrey et al.

(10) Patent No.: US 8,122,037 B2
(45) Date of Patent: Feb. 21, 2012

(54) AUTO-SELECTION OF MEDIA FILES

(75) Inventors: Grant McSheffrey, Ottawa (CA);
Edward Eric Thomas, Seattle, WA (US)

(73) Assignee: Research in Motion Limited, Waterloo (CA)

( * ) Notice: Subject to any disclaimer, the term of this patent is extended or adjusted under 35 U.S.C. 154(b) by 394 days.

(21) Appl. No.: 12/177,118

(22) Filed: Jul. 21, 2008

(65) Prior Publication Data

US 2009/0282020 A1  Nov. 12, 2009

Related U.S. Application Data

(60) Provisional application No. 61/127,796, filed on May 14, 2008, provisional application No. 61/127,813, filed on May 14, 2008, provisional application No. 61/052,640, filed on May 12, 2008, provisional application No. 61/052,633, filed on May 12, 2008.

(51) Int. Cl.
*G06F 7/00* (2006.01)
*G06F 17/30* (2006.01)

(52) U.S. Cl. ........................................ 707/758; 707/770

(58) Field of Classification Search .......... 707/600–831; 84/601, 612; 715/716, 733, 737, 748, 751
See application file for complete search history.

(56) References Cited

U.S. PATENT DOCUMENTS

| | | | |
|---|---|---|---|
| 5,713,013 A | 1/1998 | Black | |
| 6,072,479 A | 6/2000 | Ogawa | |
| 6,295,541 B1 | 9/2001 | Bodnar et al. | |
| 6,549,922 B1 | 4/2003 | Srivastava et al. | |
| 6,744,815 B1 | 6/2004 | Sackstein et al. | |
| 7,260,312 B2 | 8/2007 | Srinivasan et al. | |
| 7,346,687 B2 | 3/2008 | Lipscomb et al. | |
| 7,680,849 B2 | 3/2010 | Heller et al. | |
| 2002/0099737 A1 | 7/2002 | Porter et al. | |
| 2002/0103919 A1 | 8/2002 | Hannaway | |
| 2002/0124099 A1* | 9/2002 | Srinivasan et al. | 709/231 |
| 2002/0148343 A1 | 10/2002 | Gross | |
| 2003/0236695 A1 | 12/2003 | Litwin, Jr. | |
| 2004/0034650 A1 | 2/2004 | Springer et al. | |
| 2004/0126038 A1 | 7/2004 | Aublant et al. | |
| 2004/0205638 A1 | 10/2004 | Thomas et al. | |
| 2004/0267825 A1 | 12/2004 | Novak et al. | |
| 2005/0010616 A1 | 1/2005 | Burks | |
| 2005/0015389 A1 | 1/2005 | Novak et al. | |
| 2005/0015551 A1 | 1/2005 | Eames et al. | |
| 2005/0021470 A1* | 1/2005 | Martin et al. | 705/51 |

(Continued)

FOREIGN PATENT DOCUMENTS

EP  1227396 A1  7/2002

(Continued)

OTHER PUBLICATIONS

Wang et al., A multimedia file structure for continuous and discrete media , Sep. 14-17, 1993, IEEE, vol. 2, 644-647.*

(Continued)

*Primary Examiner* — Jean B Fleurantin
(74) *Attorney, Agent, or Firm* — Schwegman, Lundberg & Woessner, P.A.

(57) ABSTRACT

Apparatus and methods to control selection of media content provide a mechanism to enhance user interaction with multimedia devices. Additional apparatus, systems, and methods are disclosed.

21 Claims, 9 Drawing Sheets

U.S. PATENT DOCUMENTS

| | | |
|---|---|---|
| 2005/0131959 A1 | 6/2005 | Thorman et al. |
| 2005/0165752 A1 | 7/2005 | Mathew et al. |
| 2005/0210119 A1 | 9/2005 | Kumar |
| 2006/0004699 A1 | 1/2006 | Lehikoinen et al. |
| 2006/0069998 A1 | 3/2006 | Artman et al. |
| 2006/0163358 A1 | 7/2006 | Biderman |
| 2006/0188215 A1 | 8/2006 | Matsutani |
| 2006/0242259 A1* | 10/2006 | Vallabh et al. ............. 709/217 |
| 2007/0005653 A1 | 1/2007 | Marsh |
| 2007/0043765 A1 | 2/2007 | Chan et al. |
| 2007/0050366 A1 | 3/2007 | Bugir et al. |
| 2007/0112844 A1 | 5/2007 | Tribble et al. |
| 2007/0198602 A1 | 8/2007 | Ngo et al. |
| 2007/0233702 A1 | 10/2007 | Ohkita et al. |
| 2007/0271310 A1 | 11/2007 | Han et al. |
| 2008/0109449 A1 | 5/2008 | Chun et al. |
| 2009/0282050 A1 | 11/2009 | Thomas et al. |
| 2009/0282057 A1 | 11/2009 | Thomas |
| 2009/0282077 A1 | 11/2009 | Thomas |
| 2009/0282078 A1 | 11/2009 | Thomas et al. |
| 2009/0282088 A1 | 11/2009 | Thomas et al. |

FOREIGN PATENT DOCUMENTS

| | | |
|---|---|---|
| EP | 6549922 | 4/2003 |
| EP | 20070233702 A1 | 10/2007 |
| EP | 1923797 A1 | 5/2008 |
| JP | 2002041823 | 2/2002 |
| JP | 2002182658 | 6/2002 |
| JP | 2008538843 | 11/2008 |
| WO | WO-0063801 A1 | 10/2000 |
| WO | WO-02075539 A2 | 9/2002 |
| WO | WO-03036541 A1 | 5/2003 |
| WO | WO-2005116868 A1 | 12/2005 |
| WO | WO-2006116368 A2 | 2/2006 |
| WO | WO-2007145854 A1 | 12/2007 |
| WO | WO-2008008448 A2 | 1/2008 |

OTHER PUBLICATIONS

Sinitsyn, et al., "A Synchronization Framework for personal mobile server", *Proceeding of second IEEE Annual conference on PISCATAWAY*, (Mar. 14, 2004), 208-212.

Vetro, A, et al., "Media conversion to support mobile user", *Electrical and computer Engineering*, (May 13, 2001), 607-612.

Peery, C, et al., "Wayfinder: Navigating and Sharing Information in a Decentralized World", *Lecture Notes in Computer Science, Databases, Information Systems, and Peer-to-Peer Computing*, vol. 3367/2005, (2005), 200-214.

"Japanese Application Serial No. 2009-91198, Office Action mailed Mar. 9, 2011", 9 pgs.

"U.S. Appl. No. 12/177,101, Response filed Jul. 26, 2011 to Final Office Action mailed Apr. 26, 2011", 12 pgs.

"U.S. Appl. No. 12/177,105, Notice of Allowance mailed Aug. 18, 2011", 10 pgs.

"Canadian Application Serial No. 2,661,066, Response filed Aug. 4, 2011 to Examiner Report dated Feb. 3, 2011", 11.

"Canadian Application No. 2661066, Response Filed Aug. 4, 2011 to Office Action mailed Feb. 3, 2011", 21 pgs.

"Chinese Application Serial No. 200910137892.9, Office Action mailed May 25, 2011", (with English Translation), 9 pgs.

"Japanese Application Serial No. 2009-91198, Response filed Jul. 14, 2011 to Non Final Office Action dated Feb. 15, 2011", (with English Translation of Amended Claims), 10 pgs.

Satyanarrayanan, Mahadev, et al., "Coda: A Highly Available File System for a Distributed Workstation Environment", IEEE Transactions on Computers, 39 (4), (1990), 447-459.

\* cited by examiner

AUTO-SELECTION OF MEDIA FILES

RELATED APPLICATION(S)

This application claims the benefit of priority under 35 U.S.C. 119(e) to U.S. Provisional Patent Application Ser. No. 61/127,796 filed 14 May 2008, to U.S. Provisional Patent Application Ser. No. 61/127,813 filed 14 May 2008, to U.S. Provisional Patent Application Ser. No. 61/052,640 filed 12 May 2008, and to U.S. Provisional Patent Application Ser. No. 61/052,633 filed 12 May 2008, which are incorporated herein by reference in their entirety.

BACKGROUND

Access to information is an important factor in the activities of individuals in modern society. Improvements to the flow of information enhance one's ability to interact with others, to respond to changing needs, and to avail oneself of enjoyment from processing various media based information.

BRIEF DESCRIPTION OF THE DRAWINGS

Embodiments of the invention are illustrated by way of example and not limitation in the figures of the accompanying drawings in which.

DETAILED DESCRIPTION

Figure 1:
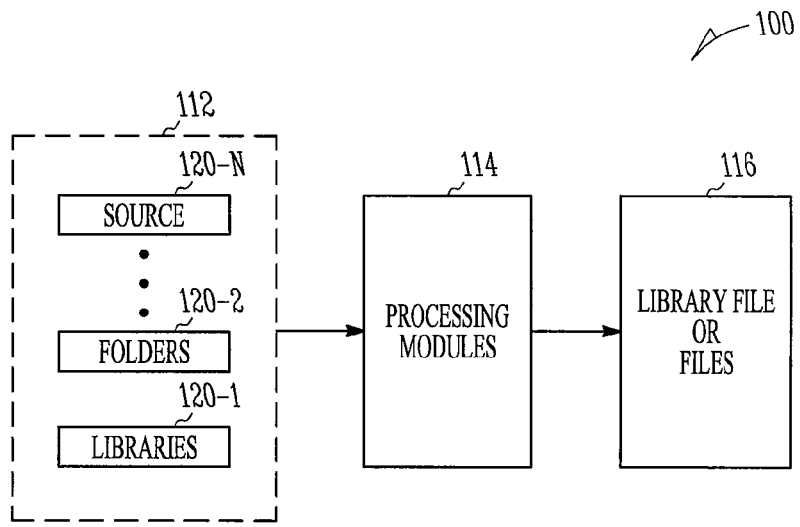
FIG. 1 is a functional block diagram of system for managing media content, according to various embodiments.

The following detailed description refers to the accompanying drawings that show, by way of illustration, details and embodiments in which the invention may be practiced. These embodiments are described in sufficient detail to enable those skilled in the art to practice embodiments of the present invention. Other embodiments may be utilized and structural, logical, and electrical changes may be made without departing from the inventive subject matter. The various embodiments disclosed herein are not necessarily mutually exclusive, as some embodiments can be combined with one or more other embodiments to form new embodiments. The following detailed description is, therefore, not to be taken in a limiting sense.

In various embodiments, media content is managed in a system. Systems and methods for managing media content may be configured such that the management may be conducted with limited user interaction and, in various embodiments, the system may perform essentially autonomously. Media is a form of general communication, information, or entertainment, which is typically intended to be used by a large audience, thought not limited to a large audience. Various media may include, but are not limited to, music, movies, music videos, television shows, interactive applications, audiobooks, podcasts, games, personal presentation, and other presentations. Each form of media may be referred to as media content or media art. An individual item of such media may be referred to as media content or media art. Media content may include content in any media format. Some examples of content may include, but are not limited to, audio files, video files, image files, and multimedia files. Audio file formats may include, but are not limited to, MP3, AIFF, WAV, MPEG-4, AAC, and Apple Lossless. Other example file formats for media content include, but are not limited to, files having extensions doc, dot, wpd, txt, xls, pdf, ppt, jpg, jpeg, png, bmp, gif, html, htm, zip, tif, tiff, and wmf. Associated with a item of media art that is stored or processed on an apparatus is a media file, which when operated on by an associated playing device (player) provides an output that can be presented as communication, information, entertainment, other presentations, or combinations thereof for the user.

Systems that manage media content may include various apparatus such as computer systems or other systems having hardware, software, and/or hardware and software to manage media content. In various embodiments, a personal computer (PC) can be used to manage media content and associated media files. A personal computer, as is generally known, herein refers to computing devices having an operating system (OS) such that use of the personal computer may be conducted by individuals having little or no knowledge of the basics of the underlying hardware and software that operate the PC and whose operation may be conducted without individuals typically authoring computer programs to operate the computer. Portable computers may include portable personal computers. An example of a portable PC is a laptop computer or notebook computer that typically has a display screen, keyboard, underlying hardware and software, and a display pointing device that are all integrated in a housing that can easily be carried by an individual. Some personal digital assistants (PDAs) may be viewed as a type of portable computer. In various embodiments, a PC may include instrumentality for managing media content and instrumentality to operate as a wireless server. A wireless server is a server configuration that communicates with an entity over a channel established by the entities in a wireless network.

Various instrumentalities can be realized in hardware implementations, software implementations, and combinations of hardware and software implementations. Some portions of the instrumentalities may be described in terms of algorithms and symbolic representations of operations on data bits within a machine memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. The instrumentality may operate to process, compute, calculate, determine, display, and/or conduct other activities correlated to processes of a machine such as a computer system, or similar electronic computing device, that manipulates and transforms data represented as physical (electronic) quantities within the computer system's registers and memories into other data similarly represented as physical quantities within the computer system memories or registers or other such information storage, transmission or display devices. The instrumentality may provide personalized capabilities, provide a pathway to other content, or combinations thereof. The instrumentality may use distributed applications, different numbers and types of software based components that couple two or more applications to enable data transfer between the applications, hardware to provide services from a number of different sources, and may be realized on a variety of platforms such as servers and content management systems. The instrumentality may include or provide access to subroutine code, code libraries, application program interfaces such as interpreters utilizing Java EE™, Simple DirectMedia Layer™ (SDL) and DirectX™, combinations thereof, or other such electronic based functionalities.

In various embodiments, a PC manages media content in relationship to one or more mobile devices. Each mobile device can play media files and can interact with the PC with respect to the management of media content on the respective mobile device. In various embodiments, the mobile devices include instrumentalities similar to those of the PC to manage the media content on the mobile device, to browse media files in one or more PCs, and to engage with a PC in interactive management of media content on the mobile device, on the PC, and on other mobile devices in which the media content may be shared. Other apparatus configured with hardware, software, and/or hardware and software to function in a similar manner as the PC to manage media content may be used in conjunction with the mobile devices. The mobile devices may be a mobile wireless communications devices. The mobile wireless communications devices may include, but are not limited to, mobile telephones, portable computers, PDAs, and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing the functionality of a personal computer.

In an embodiment, a system organizes information associated with media content from multiple media sources into a single unified library file. The information may be organized as indexed information. Managing media content is not limited to a single library file. In various embodiments, more than one library file may be utilized. Access to a library file can be provided to a number of mobile devices. The access may be provided as full access or limited access. For example, access to a library file by a mobile device may be limited to a mobile device based on whether the mobile device has one or more media players to operate on the media content. Other criteria may be used to limit access to a mobile device. In various embodiments, the library file is maintained on the system and is accessed from the mobile device remotely. In various embodiments, a library file or a modified version of a library file can be transferred to the mobile device and the mobile device can access the library file locally. The library file can be used by the mobile device to transfer media content from one or more media sources to the mobile device. The mobile device may have wireless capabilities. The mobile device may be a mobile wireless communication device.

FIG. 1 is a functional block diagram of system 100 for managing media content. System 100 includes inputs 112, processing modules 114, and outputs 116. Inputs 112 include one or more media sources 120 of media content (also herein referred to as "media sources," "media source," "sources," or "source"). Media content may include content in any media format. Some examples of content may include, but are not limited to, audio files, video files, image files, and multimedia files. Audio file formats may include, but are not limited to, MP3, AIFF, WAV, MPEG-4, AAC, and Apple Lossless. Other example file formats for media content include, but are not limited to, files having extensions doc, dot, wpd, txt, xls, pdf, ppt, jpg, jpeg, png, bmp, gif, html, htm, zip, tif, tiff, and wmf.

Media sources 112 may include media libraries 120-1 for media players such as, but not limited to, libraries for iTunes® audio players, Windows Media Player® (WMP), RealPlayer®, and other players. Each library may include collections of various media content. A collection is a subset of the files in a library. The collections may include references to the files. Each collection may refer to anywhere from zero files to all of the files in the library. An example of a collection of a music library is a playlist. In various embodiments, sources 112 of media content may be files within one or more folders 120-2 on a single computer system or on multiple computer systems.

Processing modules 114 include software and/or hardware to transfer media content from media sources to devices that use the associated media. Processing modules include instrumentality to operate as a "connector," which means that the processing modules interface with media sources to collect information associated with a media file configured to operate with a specific media player. Processing modules may be arranged with a set of connectors, one for each type of media player incorporated in system 100 or used by mobile devices whose media content is managed by system 100. Processing modules 114 may include connectors to interact with mobile wireless communication devices, where the mobile wireless communication devices are a source of media content. Processing modules 114 may use, but are not limited to, a Windows COM interface or a XML file when connecting to various media sources. In addition, processing modules 114 may create a representation (for example, a library or libraries of information regarding the media content) of the media content available from multiple media sources. In various embodiments, media content may include information with respect to another media file that is played by a media player. For instance, a jpeg (Joint Photographic Experts Group) file may be a file of album art for songs on an album, where the media files of the songs are played on a media player.

In various embodiments, output 116 from processing modules 114 is a representation created by processing modules 114. The representation may also be maintained by processing modules 114. Output 116 may include device specific data for a mobile wireless communication device or a media player. Output 116 may comprise metadata, such as metadata based on user preferences or device settings. Generally, metadata is information about data. Various media content may be metadata with respect to other media content. For example, a file having a jpg file format may provide information regarding an audio file having a mp3 file format such that the jpg file is metadata for the mp3 file.

In an example embodiment, the representation may be any means for identifying the content of the media source files. In some embodiments, a library file 116 created by processing modules 114 contains metadata for the media content available in the one or more media sources 120-1 ... 120-N, but omits the actual media content. Library file 116 may be organized using a standard format that represents the information contained in the media sources. In various embodiments, the standard format is a compressed format and/or a format that is substantially smaller than the media library itself. For example, a media library with 30 GB of audio files may be presented by processing modules 114 in a file that may be 200 KB.

In operation, system 100 for managing media content shown in FIG. 1 creates a representation of the media content available in one or more media sources 120-1 ... 120-N and provides a means for accessing the media content by any device with a media player including a mobile wireless communications device. The device may browse the representation and may select individual media content items to copy or transfer from the media source to the device. After selection, all or a portion of the media content item maybe transferred to the device and may be played on a media player on the device. In various embodiments, system 100 brings content from multiple media sources into a single unified library 116 and pushes out device specific metadata from the single library to the specific device.

Figure 2:
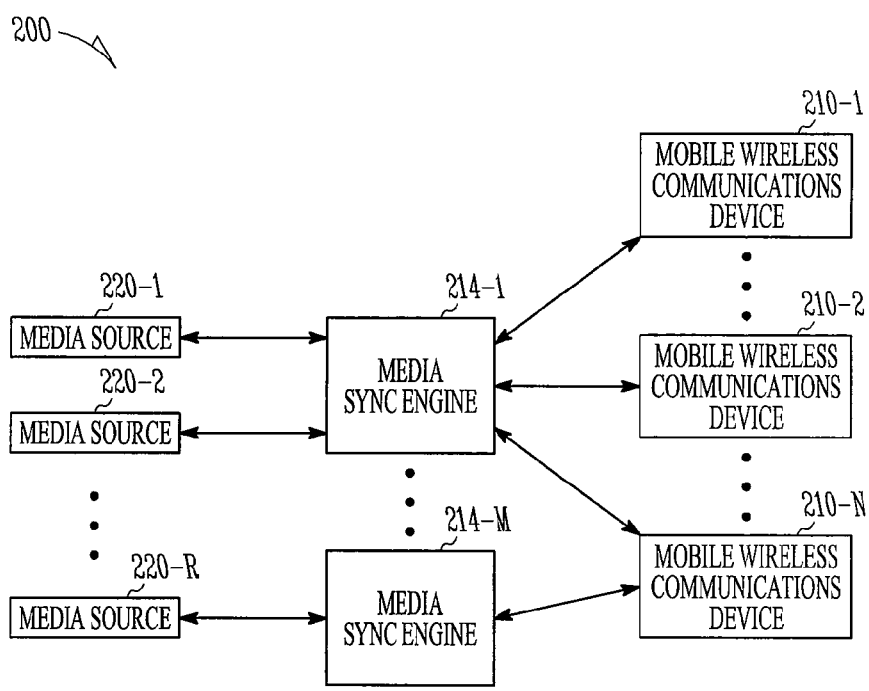
FIG. 2 shows a block diagram of an architecture for transferring media content between media synchronization engines of a system and mobile wireless communications devices, according to various embodiments.

FIG. 2 is a block diagram of an architecture for transferring media content between media synchronization engines 214-1 ... 214-M of a system 200 and mobile wireless communications devices 210-1 ... 210-N. The media content can be provided from media sources 220-1 ... 220-R. Media sources 220-1 ... 220-R can reside on system 200. The media content in media sources 220-1 ... 220-R may be provided from various sources external to system 200. For instance, media sources 220-1 ... 220-R can be media libraries resident on system 200 that are created as libraries to store media files provided by media stores accessed on the Internet. Media sources 220-1 ... 220-R may contain media files loaded in the system by a user from a portable storage medium such as, but not limited to, a CD or a DVD. Mobile wireless communications devices 210-1 ... 210-N may also be media sources. Media synchronization engines 214-1 ... 214-M (also referred to as a media sync engines or a media sync applications) that operate in the transferal of a media file may also operate to manage a media library and a metadata library file associated with the media file. The media file can be operated on by a media player to provide the media content for visual and/or audio presentation to a user of system 200 or one or more of mobile wireless communications devices 210-1 ... 210-N.

Media sync engines 214-1 ... 214-M can create representations (such as a library file or files) identifying media content available from multiple media sources and provide data from the library to mobile wireless communications devices 210-1 ... 210-N. In an embodiment, a media sync engine is an example of the processing modules shown in FIG. 1. In various embodiments, a media sync engine provides a method to synchronize a media library such as an iTunes® digital music library with a smartphone such as a BlackBerry brand smart phone. The files may be transferred using a wireless connection or a wired connection such as a high speed USB 2.0 connection.

Mobile wireless communications devices 210 may include, but are not limited to, mobile telephones, portable computers, personal digital assistants (PDAs), media players and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing the functionality of a personal computer. Multiple devices of different types/capabilities may transfer media content using one or more media sync engines.

Figure 3:
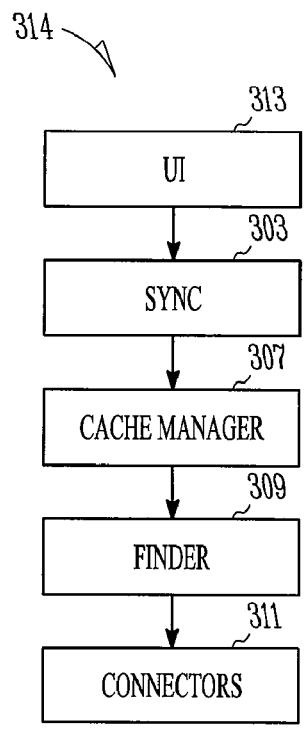
FIG. 3 illustrates a block diagram of a processing module that provides functionality similar to that of the processing modules shown in FIG. 1, according to various embodiments.

FIG. 3 illustrates a block diagram of a processing module 314 that provides at least the functionality of the processing modules shown in FIG. 1 according to an example embodiment. Processing module 314 may reside on a PC that interacts with one or more mobile devices. Processing module 314 includes a sync module 303, a cache manager 307, a finder 309, and one or more connectors 311. Sync module 303 includes instrumentality to conduct synchronization operations with the mobile devices, where the operations include adding media files to and removing media files from the mobile devices. Sync module 303 can interact with a mobile device to determine its identity and acquire information on the availability of allocated media storage on the mobile device. Sync module 303 is configured to operate with a user interface (UI) 313 of the PC.

Connectors 311 identify specific instances of a particular type of library on the PC or mobile device. In other words, connectors 311 perform a discovery function that finds individual libraries. A connector for a particular library is capable of communicating with a particular library or file using a corresponding application programming interface (API), protocols, file formats, etc. When an individual library is discovered, the connector can retrieve media collections from that instance of the individual library. Connectors 311 may include an iTunes connector, a WMP connector, a RealPlayer connector, and various other connectors correlated to instrumentality for operating on the respective media files to provide a presentation to the PC user. An individual connector may be configured as a combination of a read only connector and a writeable connector. A writeable connector may perform such activities as adding a user-assigned rating for a song, creating a playlist, editing a playlist, deleting a song, etc.

Finder 309 provides a discovery mechanism for connectors. Finder 309 may identify what connectors 311 are available for processing. The available connectors may register with finder 309. If a separate connector is used for each type of library, the particular connectors that are discovered by finder 309 can determine what type of libraries are in the system in which processing modules 314 operate.

Cache manager 307 may also determine which of the available connector(s) to use. For example, if a collection of media content may be accessed either by using iTunes software or through an iTunes xml file, cache manager 307 can determine whether to use the iTunes application connector or the iTunes xml file connector in order to access the iTunes collection. Cache manager 307 may provide a unified interface to multiple sources/libraries. Cache manager may maintain a buffer that unifies files from different libraries. For example, if the same music track is present in multiple libraries (e.g., in a user's iTunes library and in the user's Windows Media Player library), the cache manager may maintain a single buffer that is an aggregation of the tracks from the different libraries. Alternatively, cache manager 307 may maintain a separate buffer for each of the different libraries. Cache manager 307 may implement the buffer using any form of data storage. In various embodiments, the data storage may either be persistent or non-persistent.

In various embodiments, cache manager 307 may implement connector watchers. A connector watcher monitors one or more collections and determines when a collection has changed. For example, if an iTunes xml file changes or if the iTunes library has been updated, cache manager 307, which monitors that particular collection, detects the update and reads the changes into an appropriate buffer. Cache manager 307 may also determine when to update the device library.

Embodiments, as illustrated in FIGS. 1-3, and similar embodiments may be implemented as a desktop application to transfer media content from multiple sources to a mobile wireless device. The desktop application for managing media content may be launched on a PC. The desktop application may be automatically launched on startup of the PC. The desktop application may be launched on detection of a device connection to the PC. In various embodiments, a user may launch the desktop application. Alternatively, embodiments, as illustrated in FIGS. 1-3, and similar embodiments may be implemented to allow a mobile wireless device to update content already present on the mobile wireless device with media content from multiple sources.

In various embodiments, a system managing media content can be structured to operate provide a number of different features. Content from multiple media sources may be entered into a single unified library and device specific metadata pushed out from the single library. A library file in a format to provide a compact representation of media metadata may be generated as output of processing modules, similar to processing modules discussed with respect to FIGS. 1-3. Varying schema can be used for choices to select, group, and rearrange data in the representation in the file format. Various features of a managing system may include maintaining representations of original source identifications so that an identifier such as an ID, a path, etc. may be used to track/manage information regarding different multiple sources of substantially the same media content. Various features of a managing system may include injecting or modifying metadata for a media file during transfer to a device. Examples of injected metadata may include album art, volume settings and other device settings, user preferences, and other parameters.

Management of media content on a mobile device may be realized through interaction with a media sync engine of one or more apparatus, such as multiple PCs. The mobile device, such as a mobile wireless communication device, through such interaction acquires information regarding the availability of media files on each PC and an identity of the PC that was the source of media content existing on the mobile device.

Various features of the managing system may include a simplified user interface (UI) on the PC for transferring information to the mobile device and representing information that is present on the mobile device. The UI may generate representations to provide criteria for handling user selection of media content that exceeds device capacity. In various embodiments, applications in the PC may use the information in the library of the PC to autonomously handle user selection of media content that exceeds device capacity. The UI can provide an automatic fill function for a user to select such that the PC automatically handles selection of media content to transfer to the mobile device. In the various embodiments, a mobile device may be a mobile wireless communication device. A mobile wireless communication device may include instrumentality to manage media content in substantially the same manner as a PC.

Figure 4:
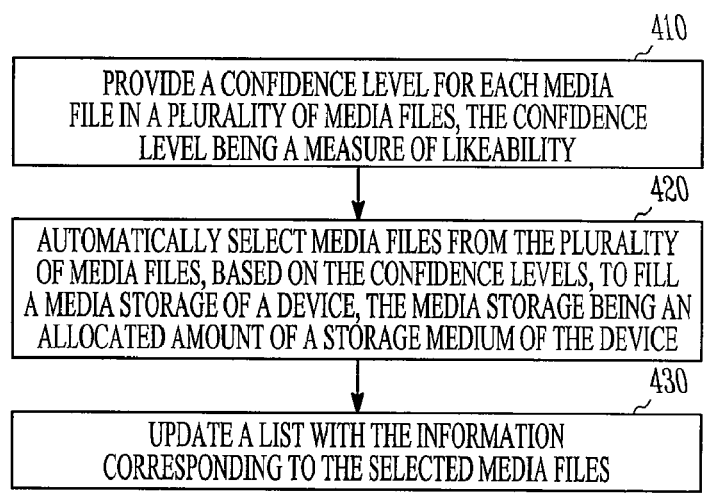
FIG. 4 illustrates features of a method that includes auto-filling an order of playing media files on a device, according to various embodiments.

FIG. 4 illustrates features of a method that includes autofilling an order of playing media files on a device. At 410, a confidence level is provided for each media file in a plurality of media files, where the confidence level is a measure of likeability. The confidence level for each media file can be provided using artifacts in metadata associated with the respective media file. The artifacts may reside in a metadata library of an apparatus. The plurality of media files may be categorized according to the confidence level of each media file. The apparatus may be a server, a PC, a PC including an instrumentality to operate as a wireless server, or other apparatus to run applications to manage media files. Such management of media files may be conducted through interactive activities with a user, through autonomous actions based on user settings and preferences, through autonomous activities based on information acquired in the apparatus including various confidence levels associated with the information, and combinations thereof.

At 420, media files are automatically selected from the plurality of media files, based on the confidence levels, to fill a media storage of a device, where the media storage is an allocated amount of a storage medium of the device. The media files selected to fill the media storage of the device are selected to fill a portion of the media storage that is determined to be available for automatic filling. The available portion may be an amount of storage remaining after a user has selected a set of media files for storage on the device. A randomizing process may be applied to a categorized set of the media files. Subsequently, a set of media of media files may be selected from the categorized set to fill the media storage of the device based on the randomizing process. A comparison of file sizes of the categorized media files can be applied with respect to a portion of the media storage that is determined to be available for automatic filling. This comparison provides an additional filter for automatically selecting the media files to fill the media storage of the device.

At 430, a list is updated with information corresponding to the selected media files. The list can be transmitted to the device as a playlist. The device may be a mobile wireless communication device.

In various embodiments, a single device can request an autofill selection of media files from multiple PCs to which it can connect. Each of these autofill selections can be combined into a single autofill playlist for the device. If a new autofill selection is requested from any individual PC, the media files, in the autofill playlist, originating from that PC can be replaced with new selections, while the media files originating from other PCs can remain untouched. In an embodiment, a mobile device, while already containing a selection of media files originating from multiple PCs, may be connected, or in communication with, a PC in which another autofill process may be requested. The currently existing selection of media files from the multiple PCs forms a single playlist of media files on the mobile device, where the currently existing selection of media files may have been obtained, either partially or completely, using autofill processes of the multiple PCs. With the currently connected PC being one of the originating PCs of the playlist on the mobile device, if the autofill process is used to choose a new selection of media files from the connected PC, the media files currently residing on the mobile device that originated from the connected PC may be deleted and replaced with a new selection of media files according to the autofill process of the connected PC. All media files originating from other PCs will remain untouched. In various embodiments, a mobile device can enter into interactive communication with a PC such that an autofill process can be conducted without transferring a media file that is determined to be essentially a copy of a media file, currently on the mobile device, that was acquired from another PC.

In various embodiments, an autofill process may be applied to a set of media art selected by a user in which the combined size of the files of the media art is larger than the allotted storage space for the mobile device for which the media art was selected. The autofill process can be used to choose a subset of the media art selected by the user. If all selected media art is considered to be equally desired by the user, the subset of the selected media art can be chosen by determining which combinations of the media art allows the largest number of media files that match the allotted storage space for the mobile device. If the selected media art is considered to have different desirability relative to each other, with respect to the user, the subset of the selected media art can be chosen by ordering the selection of media art by confidence levels of likeability with the highest confidence level first and by choosing the media art starting at the first position of the ordered list, until it is determined that additional files from the list would again exceed the allotted storage space for the mobile device.

In various embodiments, media to transfer to a mobile device can be automatically and/or randomly selected. For example, in some embodiments, the selection of media art to transfer automatically to the mobile device is based on, but not limited to, a user's previously determined selection of individual media art, playlists, folders, and libraries. In another example, the individual selection of media art to transfer to the mobile device is based on, but not limited to, a random selection of individual media art, playlists, folders, and libraries. In various embodiments, a user may select individual media art to transfer to the mobile device and, then, if additional storage space is available, a media sync application, among other actions, may randomly select additional media art to transfer to the mobile device and/or apply rules/preferences to select additional media art to transfer to the mobile device. The automatic filling of the available medium for storing media files may be limited by a threshold level to which the available medium may be stored. For example, if the mobile device has allocated X amount of storage for media files, a threshold for autofilling may be set at a percentage of the X amount, for instance 90%. The threshold level can be adjusted in the apparatus that controls the autofill selection process.

In various embodiments, the individual selection of music to transfer to the mobile wireless device may be based on rules or preferences that are either set up by the user or defined by the media sync application. Some example types of rules defined by the media sync application include rules based on ratings (e.g., transferring songs based on user ratings of the song; transferring songs based on third party ratings of the song; and so on) and rules based on frequency of use (e.g., transferring songs that have been played within a recent period of time; transferring songs that have recently been added to one or more playlists, folders, or libraries; transferring songs based on frequency of play of the song by an individual user or a group of users; and so on). However, various embodiments are not limited to rules based on ratings or frequency. Rules defined by the user or media sync application may include rules defining any type of grouping of music including, but not limited to artist, album, genre, composer, year of recording, words/phrases contained in the title or lyrics, user comments or classifications, or any other system of arranging music. In addition, rules based on frequency may be combined with rules for grouping. For example, frequency rules may be applied within each genre of music, which may be combined with frequency of rules to select a genre for download.

In various embodiments, a specifically selected list of songs may be automatically downloaded. The specifically selected list of songs may include, but is not limited to, individually songs previously selected by a user or a folder of music. A selection criterion may include a determination of the capacity of the music folder such that download of the music folder may be blocked if the contents of the music folder are too large for a target mobile wireless device. Another selection criterion may include whether or not a music folder has a threshold amount of music to provide a desired sampling of music.

In various embodiments, a randomized selection from a personal playlist may be automatically downloaded. The randomized selection may include a limited randomization in which a randomized selection of music from a selected genre, or other basis for selection, is downloaded. The selected genre, or other basis for selection, may be randomly chosen. A randomized selection from folder on the PC may be automatically downloaded. The randomized selection from a folder may include a limited randomization in which a randomized selection of music from a selected genre, or other basis for selection, is downloaded. The selected genre, or other basis for selection, may be randomly chosen.

Various criteria may be used to provide an automatic download of music. These criteria may be based on confidence levels of likeability related to, but are not limited to, the frequency of use of the song by the user, a selection according to a rating of music with higher rated music selected, selection of recently added music according to some time frame, selection of top played music from the PC based on multiple users of the PC, selection of music such that a specified amount of storage space will remain as free space in a given location of the mobile wireless device, and other features that made be quantified.

In various embodiments, confidence levels of likeability of media art can be based on features such as ratings of the media art, bit-rate for playing the media file of the media art, the length of time for playing the media art, a skip count, the instances that the user plays the media art, the relative frequency a media genre is played by the user, and other features that can be quantized to some degree by one or more applications on a PC. The confidence levels may be generated using metadata, associated with the media files, that can be autonomously collected through activities occurring on the PC and/or as metadata collected by applications running on the PC. Using these confidence levels, media files may be managed in a PC or other apparatus on behalf of the user without significant interaction with the user. In addition, such applications may be run on mobile devices such as mobile wireless communications devices.

The various confidence levels can be provided as input to the PC from various sources. For example, data correlating media art to a rating of likeability can be gathered from media-based Internet sites and publications, correlated, and entered as data in the PC. Media art such as music, movies, and books are commonly given ratings as to their quality of entertainment by different organizations. With such ratings provided on the Internet by different organizations, applications can run on the PC to acquire this rating information. In addition, a search of the Internet can be used to estimate the number of instances these rating sites are accessed to provide a relative quality level among the sources. The Internet search may be autonomously run by an application on PC that is connected to the Internet. The combination of the media art rating and the rating of the rating sources can be used to generate one form of a confidence level of likeability of the media art by the user.

A bit-rate for playing specified media art can be evaluated relative to the user's playing of the media art on the PC. For each media file of a media type played on the PC, an application on the PC can capture the number of times the media file is played. With the bit-rate for each media file known, a distribution can be generated that represents the frequency that a bit-rate is used relative to the total number of times the media type is played. The bit rate corresponding to media files that are seldom played may be given a low confidence level of likeability, while the bit rate corresponding to media files that are frequently played may be given a high confidence level of likeability.

The length of time for playing a media art may be correlated with a popularity for the media art. For example, one version of a song, having a playing length of a number of minutes, may be correlated to the popularity of the song as demonstrated by the amount of sales of the song over a length of time. Publications may publish the number of sales of the song, which may be collected by a search over the Internet. Alternatively, such data may be entered into the PC as data stored to be used by applications on the PC relative to the media files being managed by the PC. The Internet may be monitored for the public playing of the songs stored in the PC, with each occurrence being collected. Since an Internet source may not play a song for the total length of the song, a threshold may be set such that if the length of time that the song is played on the Internet is greater than the threshold, the song is considered as having been played. Since a song may have different versions corresponding to different playing times, each of the multiple versions may be taken as a song different from the other versions of the song to collect the data related to playing time monitored on the Internet. The length of play time corresponding to media files that are seldom purchased or played publicly may be given a low confidence level of likeability, while the length of time corresponding to media files that are frequently purchased or played publicly may be given a high confidence level of likeability.

A skip count, herein, is a count of the number of times a media art, which is in a ordered collection of media art, is not played during the playing of the ordered collection of media art on a PC. With a specific media art being at a $k^{th}$ position in the ordered collection, activity by a user that plays the media art at the (k+1) position of the ordered collection after the playing the media art at the (k−1) position can be monitored and a count stored in the PC can be incremented. Such an activity indicates that the user has skipped over the specific media art. For example, a user may not particularly like a song at track 2 of a particular album and may control the application on the PC playing the album to skip over song at track 2 of a particular album. However, there may be reasons for skipping over track 2 other than likeability of the song. To make an estimate of the likeability, in addition to maintaining a skip count for a specified song, a skip count is maintained along with a count of the number of times the album (an ordered collection of songs) is played on the PC. For each song on the album, the percentage of times that the song is skipped relative to the number of times the song is played can be determined and used as a statistic. The distribution of these percentages among the songs of the album can be determined and each song can be assigned a confidence level for likeability relative to the given album.

Another confidence level for likeability can be generated by taking a count of the number of times a particular album is played relative to the other albums played on the PC. This confidence level can be used as one data point when autofilling based on the entire music library on the PC. A statistic related to a count of the number of times a particular album is played can also be categorized according to genre of music played. The count of the number of times this particular album is played relative to other albums of the same genre played on the PC can be collected. Based on the frequency of play, statistics can be generated as data points for terming a confidence level of likeability to be used in autofilling a playlist and/or downloading a set of media files to a device.

The instances that a user plays a given media art may be collected on the PC and the count can be used in providing a confidence level of likeability. For example, the number of times a user plays a song, independent of whether the song is on an album, can be collected along the total number of times that the user plays songs on the PC. The collected number of times a user plays a song relative to the total number of times that the user plays songs can be used as another data point to determine a confidence level. In addition, the number of times a user plays a song, independent of whether the song is on an album, can be collected along the total number of times that the user plays songs of the same music genre on the PC.

The various features to provide characteristics to generate confidence levels can also be categorized with respect to time intervals when the media art was played. Each time interval can be given a weight. These weights can be normalized with respect to the number of time intervals considered. For instance, four intervals can be assigned weights of 0.1, 0.2, 0.3, and 0.4 with 0.4 assigned to the time interval closest to a current time and 0.1 assigned to the time interval farthest from the current time, as a possible indication of popularity. In addition, the same weights may be assigned to the same time intervals in reverse order as a possible indication of whether the user may desire a change. Then, the popularity weight and chance weight can be assigned a weight with respect to each other, and a confidence level can be generated from a combination of the different weights.

The various confidence levels of likeability of different features for each media art may be treated similar to probabilities. For example, a combined confidence level may correspond to the occurrence of two independent features, then the confidence level may be realized as the product of the confidence levels of the two features. An overall or combined confidence level of likeability can be generated by combining the respective confidence levels of the different features. The combined confidence level may be realized as an average of the confidence levels of the different features. In addition, the confidence levels may be expressed by a base 2 logarithm to allow many orders of magnitude of confidence to be efficiently expressed and compared. Further, each feature, such as ratings of the media art, bit-rate for playing the media file of the media art, the length of time for playing the media art, a skip count, the instances that the user plays the media art, the relative frequency a media genre is played by the user, and other quantized features, can be provided weights with respect to each other. These feature weights may also be treated in a manner similar to probabilities. A combined confidence level may be realized as a weighted average of the confidence levels of the different features. The various applicable weighted data points can be combined for each media art to assign an overall level of confidence with respect to the media art within its type of art. For instance, confidence levels of likeability can be applied but not limited to songs relative to songs, movies relative to other movies, and audio books to other audio books.

The assigned weights and confidence levels can be stored in the PC and accessed when an application applies these weights and confidence levels to operate on the media files managed by the PC. In addition, the assigned weights and confidence levels may be varied. Sets of assigned weights and confidence levels may be stored to account for variances in the collected data and different views proportioning the features to assign weights and confidence levels. In forming an autofill of media art for a device at different times, different sets of assigned weights and confidence levels can be used. In addition, each set may be given a weight. A random number generator may be used to select a particular set.

The confidence levels for likeability can be used in a number of ways to provide an autofill of media files for a device. For instance, for a playlist of songs, the list of song tracks can be generated. A random number can be generated and compared to the confidence level of a song on the list. If the random number is less than the confidence level, the song can be selected for the playlist. In addition, if the size of the media file for the song is less than the available space in the allotted storage capacity for music media files on the device, the song is placed on the playlist. When the song is placed on the playlist, a count or measure of the available storage space on the device is decreased by the size of the media file of the song placed on the playlist. If the random number was greater than the confidence level, the song is not selected for the playlist. A random number is generated for another song and compared with the confidence level of this song with the song placed on the playlist only if the random number is less than the confidence level of this song and the music file for the song is less than the current available storage space on the device. If the media file is large than the available storage space, the song is not placed on the playlist and another song is evaluated with respect to its confidence level and the amount of available space in the allotted storage capacity. A playlist may be generated in which the selected songs do not completely fill the allotted capacity as a result of the selection process. Various permutations of this process may be used, such as ordering the list of songs by confidence level before beginning the use of the random number generator. Also, the comparison of the random number with the confidence level may be made with respect to selection corresponding to the random number being greater than the confidence level. In various embodiments, prior to the selection process, all songs having a confidence level less than a threshold confidence level may be eliminated for consideration in the autofill process.

Other autofill procedures may be implemented. For autofilling a playlist of songs, the songs may be ordered by their confidence levels. Filling the playlist may be realized by comparing the size of the media file with the allotted storage capacity for music media files on the device. If the size of the media file is less than the allotted storage capacity, the song is added to the playlist and a count of the allotted storage is decreased by the amount of media file of the selected song. If the size of the media file is greater than the allotted storage capacity, the song is not added to the playlist and the next song on the ordered list is evaluated with respect to the current count of the allotted storage. The process continues until the playlist is full of songs such that the size of the combination of selected media files is less than the actual allotted storage capacity of the device determined at the start of the process and each of the songs on the ordered list not selected for the playlist has a file size that is greater than the difference between the actual allotted storage capacity and the size of the combination of selected media files. In various embodiments, prior to the selection process, all songs having a confidence level less than a threshold confidence level may be eliminated for consideration in the autofill process.

Other procedures for selecting media art for a playlist using confidence levels associated with the media art may be implemented for an autofill process. In various embodiments, modifications to the various procedures may be made such that the autofill may be conducted within a selected genre of the media art to autofill just with media art of the selected genre. A confidence level of likeability can be assigned to the different genres of a media art and an autofill by genre may be conducted beginning with selection of a genre using a random process to select the genre based on the confidence levels of likeability of the genres. The use of confidence levels can be adjusted to limit the factors contributing to the confidence levels to those that are appropriate for selection of genres as the basis for auto-fill. In various embodiments, modifications to the various procedures may be made such that the autofill may be conducted based on other features of a media art such as, but not limited to, play length and bit-rate for playing the media art, where the use of confidence levels is adjusted to limit the factors contributing to the confidence levels to those that are appropriate for the feature selected as the basis for auto-fill. The feature selected as the basis for the autofill process may also be selected using a random process with respect to the confidence levels of the feature types with respect to each other.

In various embodiments, a UI for managing media files on a device and pending transfers is provided. The UI may include graphical indicators for status (e.g., on device, on PC, etc) and/or actions (e.g., download, purchase, preview, email, play remotely). Some example UI screens from a device are provided in FIGS. 5-10.

The embodiments shown in FIGS. 1-4 may be implemented as a desktop application to synchronize media content with a mobile wireless communications device. The embodiments shown in FIG. 1-4 may also allow a user to use a mobile wireless communications device to browse and synchronize a library on a PC with a library on the mobile wireless communications device.

In various embodiments, device configurations and operational methods are provided for a user of a mobile wireless communications device to remotely view and/or manage their music home music libraries directly from their mobile wireless communications device with the ability to synchronize/transfer music through wired connectivity and/or wirelessly and justifies them within their context of use. Such transfer may be realized in a personal computer (PC). Such transfer may be realized in a wireless server in which the user and/or the mobile wireless communications device are registered as being allowed to enter into such transfers. The wireless server may be configured in a personal computer. The mobile wireless communications device may be a handheld device such as a cell phone-type device. The mobile wireless communications device may be a portable computer such as a lap-top computer. Such configurations and operating structures provide a straight-forward user friendly way, both in a user's mobile wireless communications device and in a personal computer of the user, for managing multimedia files, audio files, video files, and/or combinations thereof, belonging to a user or which the user is allowed to access.

In various embodiments, transfer/sync of multimedia files, audio files, video files, and/or combinations thereof between a computer (and associated media managers of the computer) and a mobile wireless communications device may be accomplished using a number of mechanisms. The transfer/sync between the mobile wireless communications device and the wireless server maybe accomplished through a USB connection. The transfer/sync between the mobile wireless communications device and the wireless server maybe accomplished through a Wi-Fi communication session. The transfer/sync between the mobile wireless communications device and the wireless server maybe accomplished over wide area network (WAN) such as a wireless network.

In various embodiments, a mobile wireless communications device is configured with hardware, software, and combinations thereof to view offline, from its associated PC or associated wireless server and offline from the Internet, a library or libraries that may include multimedia files, audio files, video files, photos, videos, podcasts, and/or combinations thereof in the mobile wireless communications device. Such libraries may include libraries of iTunes®, Windows Media Player®, other music libraries, video libraries, and other multimedia libraries. The mobile wireless communications device may include executable instructions allowing its user to view, edit, delete, and schedule multimedia, music, video, and/or combinations for sync between the mobile wireless communications device and its associated personal computer or wireless server. All changes/requests/transfers may occur automatically upon establishment of one of more of USB, Wi-Fi, or WAN connections to the associated personal computer or wireless server. In various embodiments, the personal computer may be configured with appropriate instrumentalities to operate as a wireless server. The hardware and software of the mobile wireless communications device may include a multimedia sync application having a remote management tool to manage a user's libraries of the user's PC, such as but not limited to music from the user's iTunes® or Windows Media Player® (WMP), directly from the mobile wireless communications device. Various embodiments provide functions to manage, play, and sync multimedia presentations, video, and/or music that bridge the gap between PC sync and remote access to realize media management from a handheld wireless device rather than limiting such management to a desktop.

In various embodiments, mobile wireless communications devices are configured to allow offline access to a user's entire PC music library and to allow a 2-way sync, including wireless, between the mobile wireless communications device and the target media manager on a user's PC. For example, a mobile wireless communications device may be configured to schedule downloads and syncs of media avoiding limitations associated with streaming the media content directly to the handset. The mobile wireless communications device may be configured with a remote management application and a wireless sync application, where each has access (an optimized copy) of the user's media library directly from the mobile wireless communications device. Access to this library may not require a network connection to an associated PC or a server on the Internet. The library may be arranged as a multimedia library, a music library, a video library, or a combination thereof. In an embodiment, an optimized version of a user's music library may be contained on the user's mobile wireless communications device allowing for offline viewing and management such that only the optimized music library file (i.e. an "index") is present on the user's mobile wireless communications device, not the actual songs themselves. Any edits or requests for download/sync will sync with the user's associated PC upon connection via USB, WAN, or WLAN (wireless local area network). New media content, such as new music content, that have been requested for download may be contained in a download "manager"/ queue and may be sent to the user's device upon the next USB or Wi-Fi connection. The download may be sent on the next connection in a wireless network to which the computer is coupled. In an embodiment, should the user choose, they can force transfer/download of any item in the pending download queue over a cellular network.

In various embodiments, a mobile wireless communications device may be configured with hardware and software that provide: simple ease of use for the user, integration between the mobile wireless communications device and a desktop manager and/or a media sync application of a wireless server configured in a personal computer, support of USB sync, WLAN sync, WAN sync, or sync using combinations thereof between a user's PC and their mobile wireless communications device, integration with different media players such as but not limited to iTunes® and Windows Media Player®, ability for a user to view their media libraries directly from the mobile wireless communications device without a network connection for viewing via a small/optimized copy of the libraries, ability to view library content by album, artist, genre, playlists, ability to add music, such as but not limited to individual songs, albums, artists, playlists to a download manager/queue, ability to transfer/synchronize media in the download queue with the user's mobile wireless communications device upon next USB or Wi-Fi connection to their associated PC or associated PCs, and a 2-way sync with media libraries on the users home PC. A 2-way allows for activity on a mobile wireless communications device to be conducted in a manner similar to the activity of the PC. For example, if a user deletes music or creates/edits a playlist from their mobile wireless communications device, the data can be transmitted wired and/or wirelessly, and these changes reflected in the media libraries on the user's associated PC, which may include iTunes® and WMP among others. Further, if a user deletes music or creates/edits a playlist from their associated PC via one or more libraries on the PC, the data can be transmitted wired and/or wirelessly, and these changes reflected on the mobile wireless communications device. For example, new media content that have been requested for download may be contained in a download manager/queue and may be sent to the user's mobile wireless communications device upon the next USB, Wi-Fi, or wireless network connection. Should the user choose they can force transfer/download any item in the pending download queue over a cellular network.

In various embodiments, a mobile wireless communications device may be configured to operate with any operating system that may be used in a cellular device. The mobile wireless communications device may be configured with access to media functions with external controls to virtually provide for unlimited storage for a user's media, with independence from the PC desktop to manage all user media needs directly from their portable wireless device, with an open marketplace to discover/acquire music directly from a portable wireless device, with automatic updates/sync of activity conducted on a portable wireless device, with ability to play music on a portable wireless device with other devices such as a car, a home stereo, or other such device, with remote access from the user's mobile wireless communications device to access to their PC library of music and other media.

Figure 5:
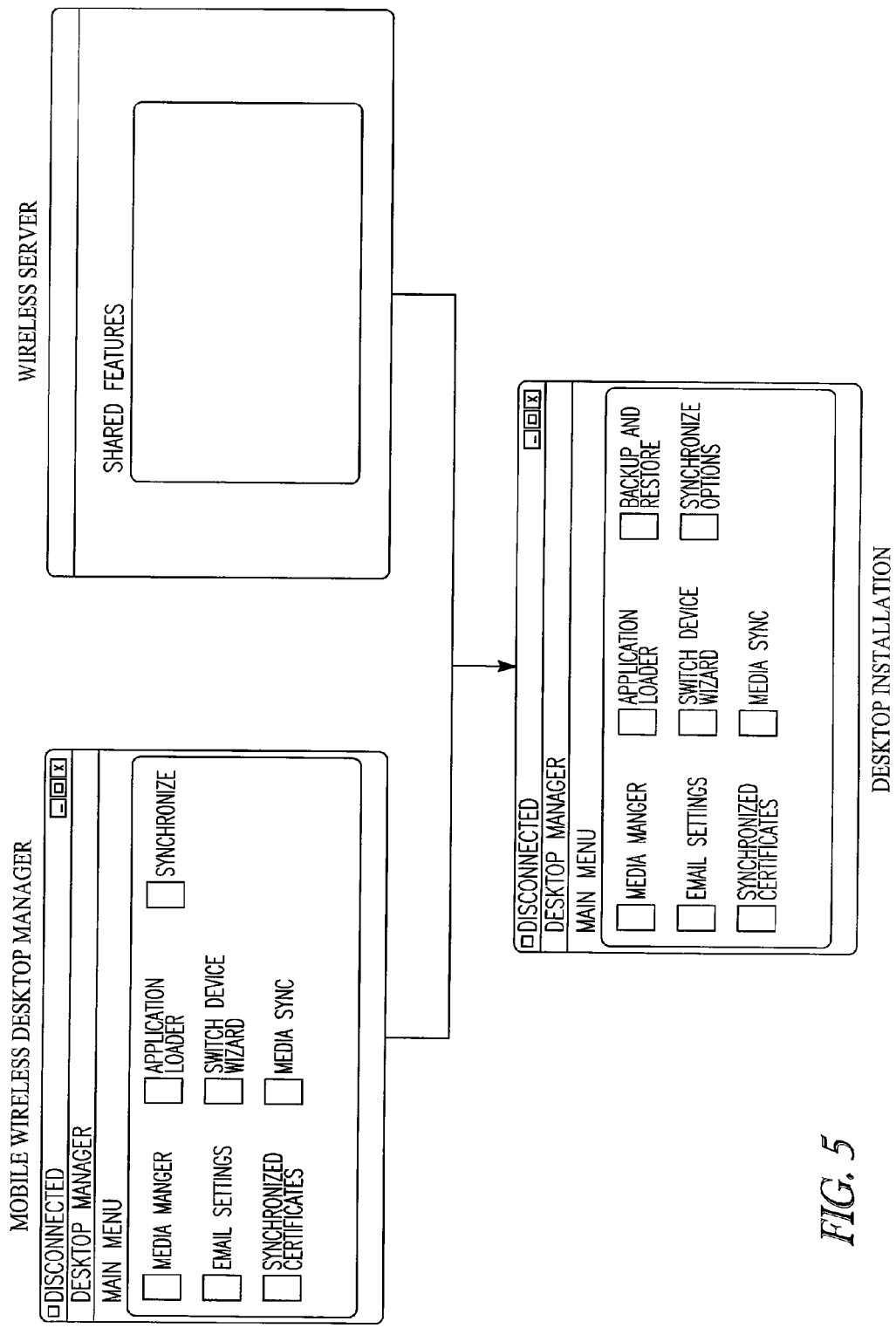
FIG. 5 illustrates an embodiment of a media wireless sync feature installed on a PC with installation of an associated wireless server, according to various embodiments.

In various embodiments, a media wireless sync feature may be installed on a PC with installation of an associated wireless server, as illustrated in FIG. 5. The installation may be realized using a USB connection. The installation may be realized initiated using a USB connection and completed over an Internet connection. The installation may be realized using a Wi-Fi connection. The installation may be realized initiated using a Wi-Fi connection and completed over an Internet connection. After completion of the installation of the media wireless sync feature, a message indicating that the media wireless features/functionality are enabled may be provided to the user via the mobile wireless communications device, the PC, and/or both.

The media sync application of the mobile wireless communications device may support multiple mobile wireless communications device/users within a home, based on a registration, for example based on a personal identification (PIN). The libraries and the sync to these libraries may be partitioned among the various users of the PC. For example, one person may choose to sync music with one library such as iTunes®, another person may choose to sync with another library such as Windows Media Player®, and a third person may choose to sync with both libraries. The user interface of the wireless server on the PC may allow for dynamic selection of supported media managers as well as remember the last media manager (store the identity of the last media manager or last several media managers) to which a specific mobile wireless communications device synchronized with it and to remember preferences associated with the synchronization. In an embodiment, a file may be specified not to be transferred to the mobile wireless communications device, unless the file is supported by the mobile wireless communications device. Users may be made aware of this through a graphic user interface, if a specific file or file type has been identified as not being selectable for sync. For example, music files that are not to be synced may be shown using an icon or other indicator of a lock condition, when a user is viewing their music library from the mobile wireless communications device.

Figure 6:
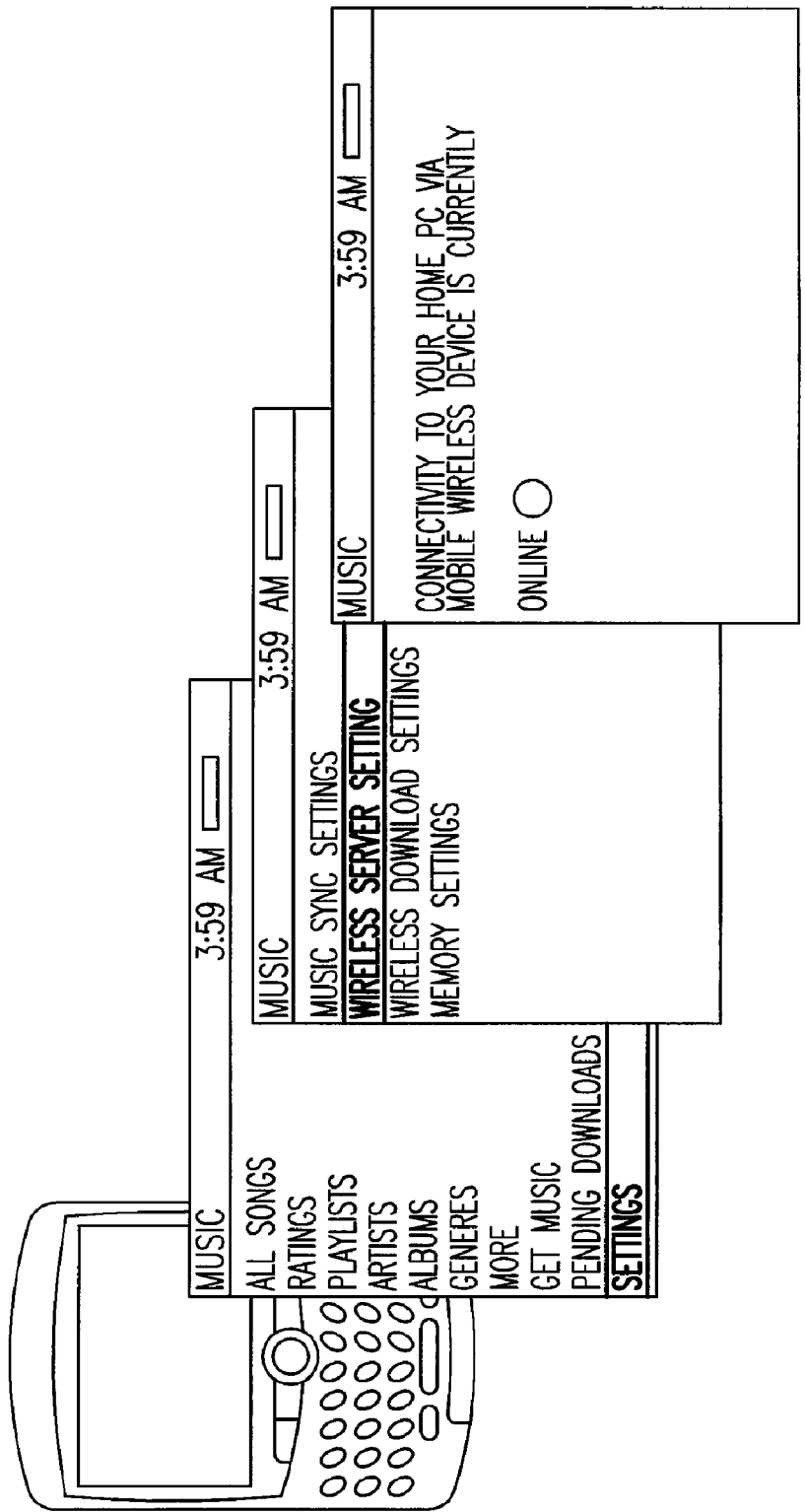
FIG. 6 illustrates an embodiment of an example of a user interface showing connectivity, according to various embodiments.

From the user's mobile wireless communications device, the user may observe the status of connectivity to their home PC via a wireless server on the home PC. This view can enable the user to determine if they are able to sync and/or download content via Wi-Fi, WAN, or other connection. FIG. 6 illustrates a non-limiting example of a user interface showing connectivity. A media sync application provides a user with an ability to view (offline) either a media library directly from a mobile wireless communications device allowing them to view, edit, delete, and schedule music for sync. All changes/requests/music transfers can occur upon a USB, Wi-Fi, or WAN connection to their home PC. With a wireless server on a home PC offline, an error message may be generated to indicate the status of the wireless server when attempting to force a transfer or download via a network connection.

An optimized version of a user's music library contained by a library in the user's PC may be contained on the user's device allowing for offline viewing and management. The optimized media library file may be arranged as an index on the user's mobile wireless communications device. Media filed in the mobile wireless communications device may be stored in the mobile wireless communications device separate from the optimized media library file. During setup (and at any time) of the desktop media sync application, users can select which media manager or managers that they would like configured for remote management and wireless sync.

From a user's mobile wireless communications device, a user may able to enter the total music library or individual libraries and sort by all songs (name), artist, album, and music genre. The user may also be able to view by all playlists, standard and smart (automatic) as well as those contained in folders. When viewing a playlist from the mobile wireless communications device, users also may able to view/sort by all songs (name), artist, album, and music genre. Viewing and sorting is not limited to music but may be applied to photos, video, and other multimedia presentations. With the optimized music library file as an index present on the users mobile wireless communications device, and not all the actual songs themselves contained within the library, the optimized library may be sufficiently small allowing the library to be stored on the internal memory of the user's mobile wireless communications device. In various embodiments, swapping memory cards does not disable remote management.

In various embodiments, the optimized media library file on the user's mobile wireless communications device may be refreshed and kept in sync with the media libraries on the user's PC. This sync may provide automatic updating so that the most up to date view of the media library accessible to the PC is available to the user from their mobile wireless communications device. An updated/synchronized copy of the media library may be transferred to the user's mobile wireless communications device upon the next USB/WLAN/WAN connection to the desktop music sync application.

Figure 7:
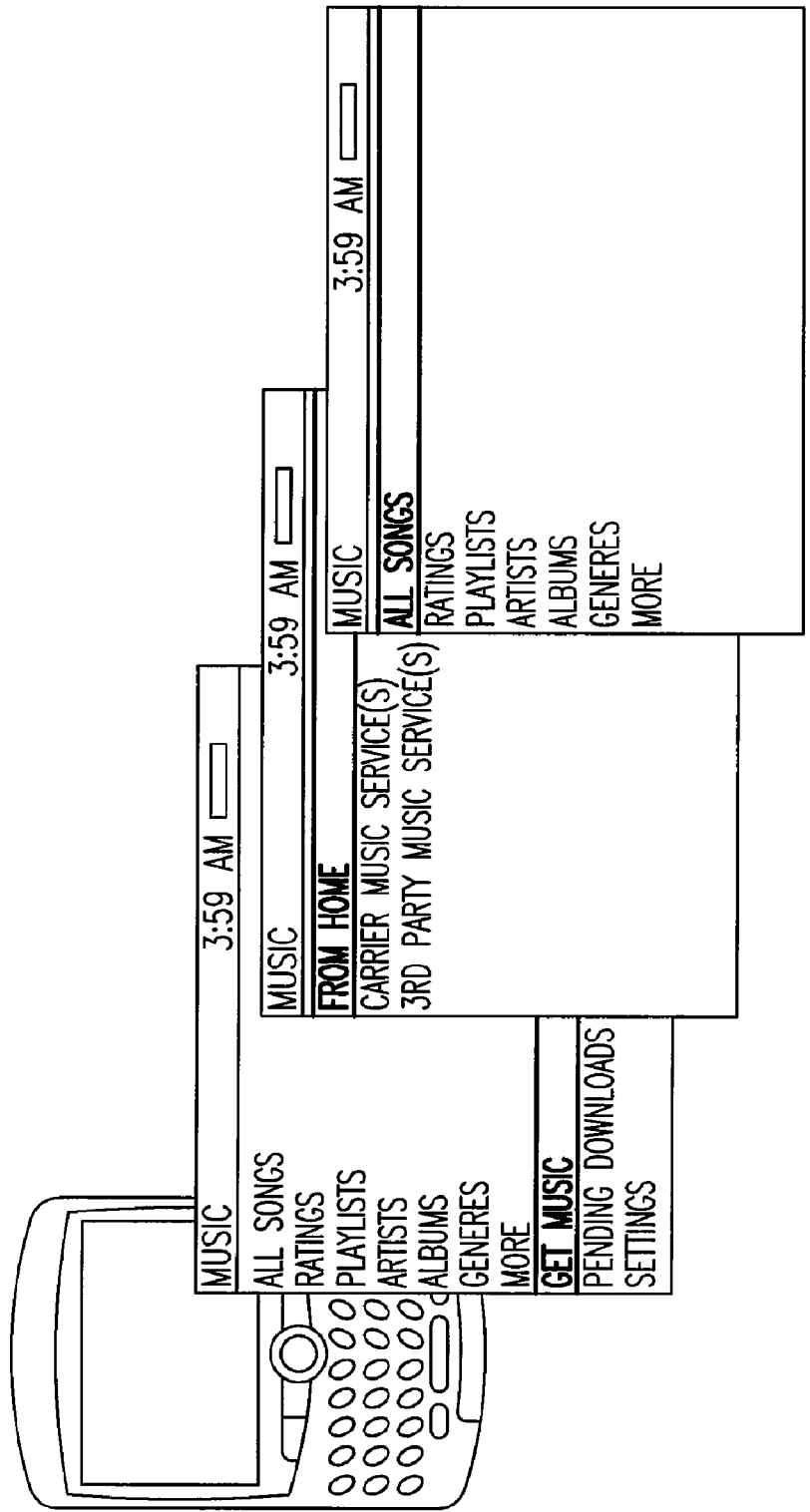
FIG. 7 illustrates an embodiment of an example of a user interface when accessing a home music library, according to various embodiments.

FIG. 7 shows an example of a user interface when accessing a home music library. The user interface is not limited to a home music library but may be libraries of other multimedia presentations. As shown, the user interface provides access and management of a user's music library, for example a user's iTunes® or WMP music library, that is easy to use, intuitive, and be structured in such a way that it allows users to easily view their music libraries directly from the music application on the mobile wireless communications device.

Figure 8:
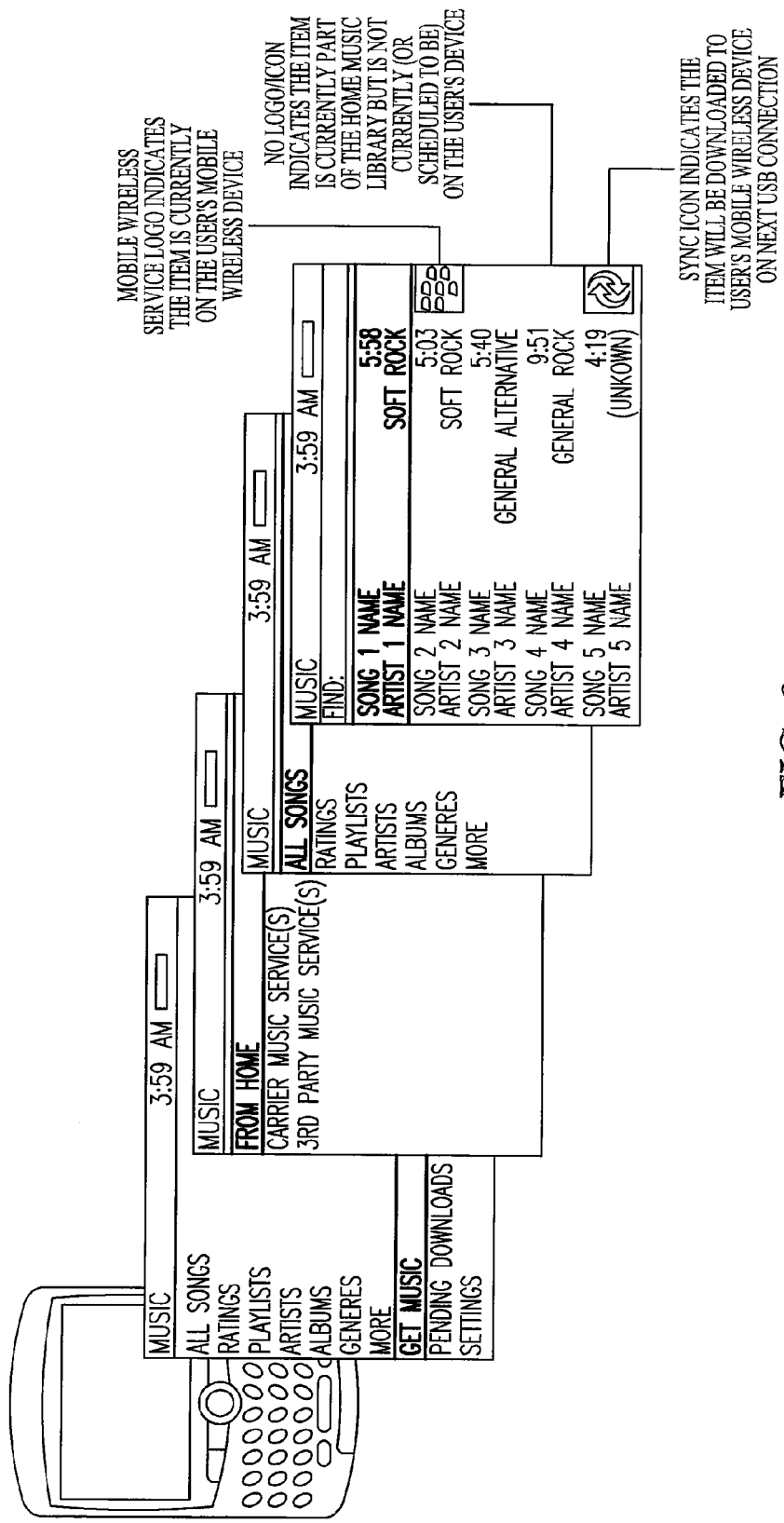
FIG. 8 illustrates an embodiment of an example of viewing a media library, according to various embodiments.

In viewing their home media library from the mobile wireless communications device, the view may be provided in a manner that it similar to how the media library is displayed on the local PC. FIG. 8 illustrates an example of viewing a media library that is easy to use, intuitive, and structured in such a way that it allows users to easily view their media library directly from the media application on the mobile wireless communications device. The view may also provide a view of media that is on their mobile wireless communications device vs. what is not on the mobile wireless communications device with respect to what is in the home libraries. The view may also provide a view of media that has been added to the media download manager as pending downloads that will be transferred/synchronized with their device upon the next USB sync, WLAN sync, or WAN sync with the mobile wireless communications device. The user may also be provided with an indication of the total amount of memory corresponding to media on their mobile wireless communications device including free/available memory, media at an associated PC such as a home PC, and media in the download manager pending download. The media may be further presented in various categories such as music, video, and other multimedia presentations.

In various embodiments, when a user views their home music library, it may be similar to how they view the media local to their mobile wireless communications device to edit the home media library. Users may be able to edit their home music library from a remote management application with a wireless sync feature allowing them to delete media, such as music, on a selected basis and/or edit playlists. For example, the selected basis allows for editing music based on individual songs, albums, artists, genres, or playlists. For example, using edit playlists as a basis allows for adding and/or removing songs contained in one or more playlists. These edits may sync with the users PC and the corresponding media manger library or libraries upon the next USB/WLAN/WAN connection to the desktop media sync application on their home PC. Delete actions may be accompanied by a prompt inquiring as to whether or not the user would like to delete the item from the specified library on the mobile wireless communications device only (keep file on computer) or from the specified library on the associated computer as well.

Figure 9:
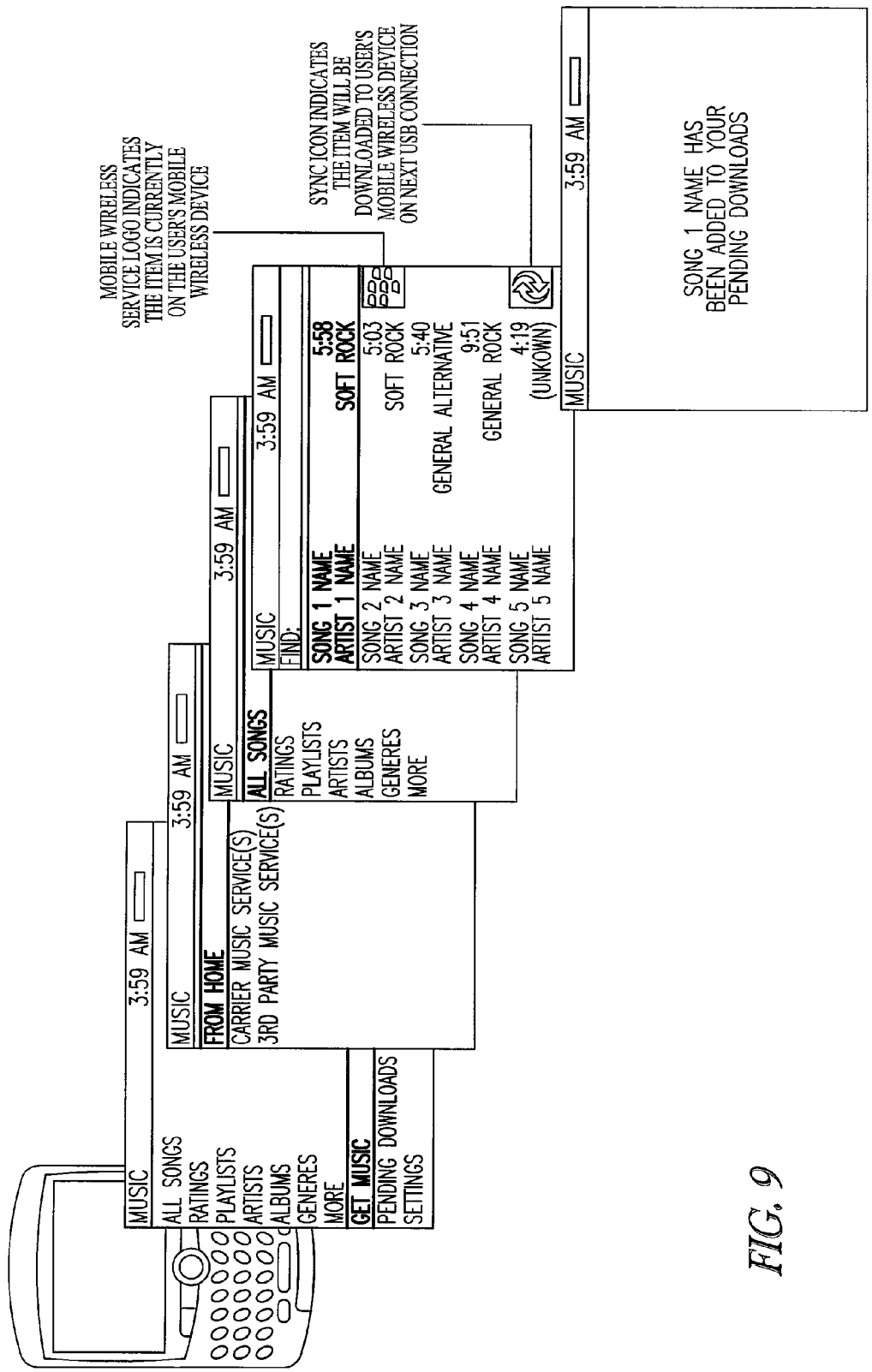
FIG. 9 shows an embodiment of an example of a user interface with respect to adding music to the download manager, according to various embodiments.

FIG. 9 shows an example of a user interface with respect to adding music to the download manager. While viewing a user's home music library, the user may add the following to a download music manager as pending downloads: individual songs, individual albums, individual artists (all songs by an individual artist), individual genres (all songs contained in a single genre), entire playlists, and other categories for arranging music. Additions are not limited to music, but apply to other multimedia presentations. As an example, this addition feature can be shown as a menu item called "sync with mobile wireless communications device" or "add to downloads"

when any of the above categories is highlighted. This may be similar to how adding items local to a mobile wireless communications device is handled with respect to playlists local to the mobile wireless communications device. Users may be able to view all items that are currently "pending sync/download." A remote media access implementation may notify a user if they are attempting to schedule/sync content whose total is larger than the device's available/free memory (external plus internal). The user may be notified/prompted on their device of the total content they are attempting to sync (i.e. what is in the media download manager or "pending downloads" queue) and the available space on the mobile wireless communications device and be instructed to remove content from the sync list or device.

Figure 10:
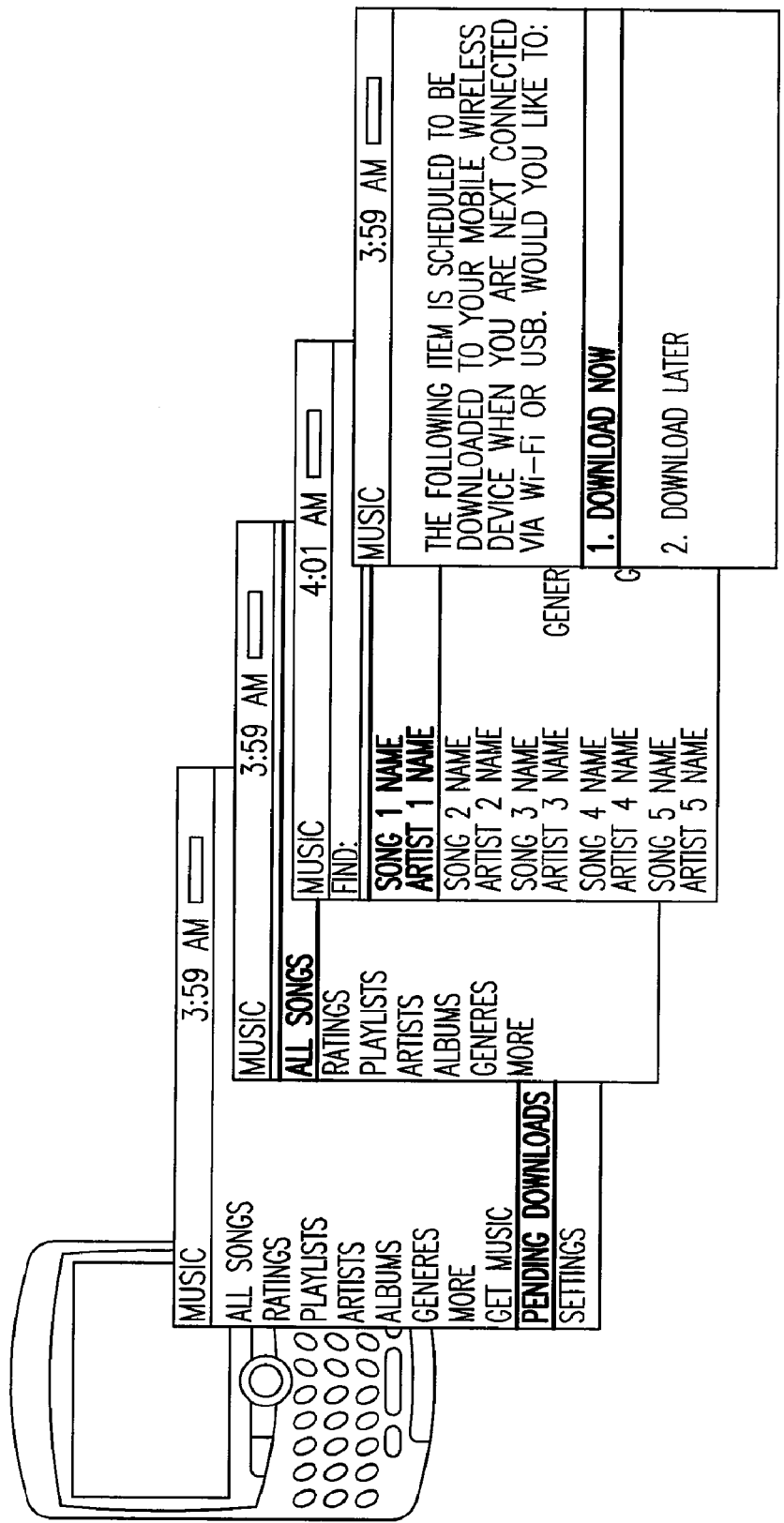
FIG. 10 shows an embodiment of an example of a user interface for viewing a download manager, according to various embodiments.

FIG. 10 shows an example of a user interface for viewing a download manager. This view provides users with the ability to view the media download manager for pending downloads directly from the media home screen of the mobile wireless communications device media player. For example, music that has been requested for download (added to the pending downloads/queue) can be delivered to the mobile wireless communications device upon the next USB, Wi-Fi, or WAN connection. Viewing the items in the pending downloads list may be similar to viewing music on a users mobile wireless communications device and can be sortable (with totals next to each in brackets) by all songs, album, artist, genre, playlists, and other categories.

A user may be provided with a view that indicates in a straight forward manner the total amount of memory corresponding to individual items in the download manager and to total items in the download manager. The following options may be available to the user when viewing the contents of the download manager: (1) delete (i.e. remove items from the download manager), which may include an item no longer being requested for transfer/sync with the device, and (2) download now, which allows for manual force transfer of media via a WAN. Users may be prompted that this may result in cellular data charges as per their existing mobile wireless communications device data plan. Other options may be provided.

Figure 11:
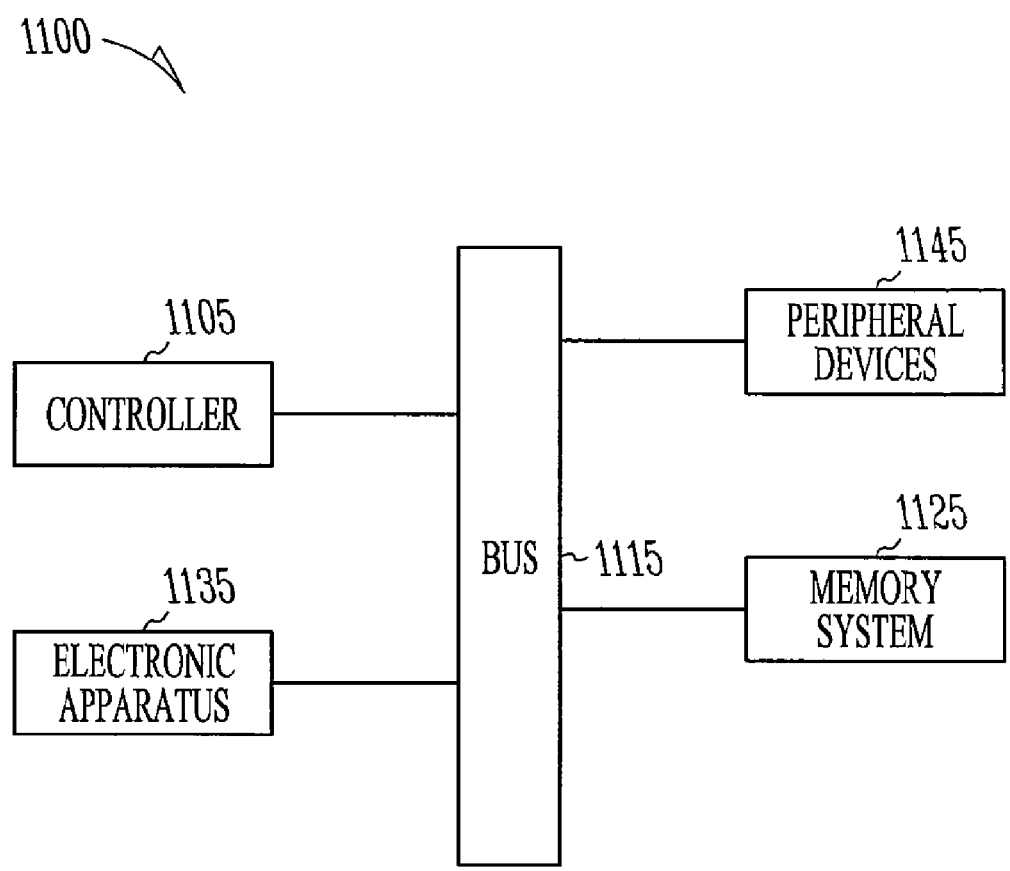
FIG. 11 depicts a diagram of an embodiment of a system having a controller and a memory system, according to various embodiments.

FIG. 11 depicts a diagram of an embodiment of a system 1100 having a controller 1105 and a memory system 1125. System 1100 also includes electronic apparatus 1135 and a bus 1115, where bus 1115 provides electrical conductivity among the components of system 1100. In an embodiment, bus 1115 includes an address bus, a data bus, and a control bus, each independently configured. In an alternative embodiment, bus 1115 uses common conductive lines for providing one or more of address, data, or control, the use of which is regulated by controller 1105. Bus 1115 may be realized as multiple busses. In an embodiment, electronic apparatus 1135 is additional memory system configured in a manner similar to memory system 1125. In an embodiment, additional peripheral device or devices 1145 are coupled to bus 1115. In an embodiment, peripheral devices 1145 include displays, additional storage memory system, and/or other control devices that may operate in conjunction with controller 1105 and/or memory system 1125. In an embodiment, controller 1105 is a processor.

Controller 1105 and memory system 1125 can be arranged to manage media content and associated information on system 1100. In an embodiment, system 1100 is arranged as a PC. The PC may include instrumentality distributed throughout the PC to operate as a wireless server. System 1100 arranged as a PC can operate according to any of the various embodiments discussed herein to manage media content and associated information within the PC and/or in conjunction with one or more mobile devices such as mobile wireless communications devices.

In an embodiment, system 1100 is arranged as a mobile device. The mobile device may be a mobile wireless communications device. System 1100 arranged as a mobile device can operate according to any of the various embodiments discussed herein to manage media content and associated information within the mobile device, and/or in conjunction with a PC or other apparatus having software and/or hardware to manage media content.

Various embodiments or combination of embodiments for apparatus and methods for a system, such as a PC, to manage media content, as described herein, can be realized in hardware implementations, software implementations, and combinations of hardware and software implementations. These implementations may include a machine-readable medium having machine-executable instructions, such as a computer-readable medium having computer-executable instructions, for operating the system in a relationship with one or more mobile devices such that media content and associated information is managed between the system and the mobile device. The communications of the system with a mobile wireless communications device can be conducted on a secured basis. The machine-readable medium is not limited to any one type of medium.

Various embodiments or combination of embodiments for apparatus and methods for a mobile device, such as a mobile wireless communications device, as described herein, can be realized in hardware implementations, software implementations, and combinations of hardware and software implementations. These implementations may include a machine-readable medium having machine-executable instructions, such as a computer-readable medium having computer-executable instructions, for operating the mobile device to manage its media content and associated information within the mobile device, in conjunction with a system, such as a PC, and/or with respect to other mobile devices. The communications between a mobile wireless communications device and the system can be conducted on a secured basis. The machine-readable medium is not limited to any one type of medium.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A computer implement method comprising:
providing a confidence level for each media file in a plurality of media files, the confidence level being a measure of likeability;
automatically selecting media files from the plurality of media files, based on the confidence levels, to fill a media storage of a device, the media storage being an allocated amount of a storage medium of the device; and
updating a list with information corresponding to the selected media files, wherein the method includes:
categorizing the media files based on the confidence levels of each media file; and
applying a comparison of file sizes of the categorized media files, with respect to a portion of the media storage that is determined to be available for automatic filling, as a filter for automatically selecting the media files to fill the media storage of the device.

2. The method of claim 1, wherein the method includes transmitting the list to the device and transmitting the selected media files to the device without transferring an identified selected media file for which a copy of the content of the identified selected media file resides on the device, the copy being identified as having originated from a source other than the system, the device being a mobile wireless device.

3. The method of claim 1, wherein the portion of the media storage is less than the entire amount of media storage determined to be physically available for automatic filling.

4. The method of claim 1, wherein providing a confidence level for each media file includes providing the confidence level for each media file using artifacts in metadata associated with the respective media file.

5. The method of claim 1, wherein the method includes:
applying a randomizing process to the categorized media files; and
selecting the media files to fill the media storage of the device based on the randomizing process.

6. The method of claim 1, wherein collecting data includes autonomously accessing the Internet from the system to collect a portion of the data on one or more of the media files from a site on the Internet, the site external to the system.

7. A machine-readable storage medium that stores instructions, which when performed by a machine, cause the machine to perform operations comprising:
providing, in the machine using a controller of the machine, a confidence level for each media file in a plurality of media files, the confidence level being a measure of likeability;
automatically selecting media files from the plurality of media files, based on the confidence levels, to fill a media storage of a device, the media storage being an allocated amount of a storage medium of the device; and
updating a list with information corresponding to the selected media files, wherein the instructions include:
categorizing the media files based on the confidence levels of each media file; and
applying a comparison of file sizes of the categorized media files, with respect to a portion of the media storage that is determined to be available for automatic filling, as a filter for automatically selecting the media files to fill the media storage of the device.

8. The machine-readable storage medium of claim 7, wherein the instructions include transmitting the list to the device and transmitting the selected media files to the device without transferring an identified selected media file for which a copy of the content of the identified selected media file resides on the device, the copy being identified as having originated from a source other than the machine, the device being a mobile wireless device.

9. The machine-readable storage medium of claim 7, wherein the portion of the media storage is less than the entire amount of media storage determined to be physically available for automatic filling.

10. The machine-readable storage medium of claim 7, wherein providing a confidence level for each media file includes providing the confidence level for each media file using artifacts in metadata associated with the respective media file.

11. The machine-readable storage medium of claim 7, wherein the instructions include:
applying a randomizing process to the categorized media files; and
selecting the media files to fill the media storage of the device based on the randomizing process.

12. The machine-readable storage medium of claim 7, wherein the instructions collecting data includes autonomously accessing the Internet from the system to collect a portion of the data on one or more of the media files from a site on the Internet, the site external to the system.

13. An apparatus comprising:
a processor;
a machine-readable storage medium that stores instructions, the machine-readable storage medium operably coupled to the processor such that the instructions, when executed by the processor, cause the apparatus to perform operations comprising:
providing a confidence level for each media file in a plurality of media files, the confidence level being a measure of likeability;
automatically selecting media files from the plurality of media files, based on the confidence levels, to fill a media storage of a device, the media storage being an allocated amount of a storage medium of the device; and
updating a list with information corresponding to the selected media files, wherein the instructions include:
categorizing the media files based on the confidence levels of each media file; and
applying a comparison of file sizes of the categorized media files, with respect to a portion of the media storage that is determined to be available for automatic filling, as a filter for automatically selecting the media files to fill the media storage of the device.

14. The apparatus of claim 13, wherein the instructions include transmitting the list to the device and transmitting the selected media files to the device without transferring an identified selected media file for which a copy of the content of the identified selected media file resides on the device, the copy being identified as having originated from a source other than the apparatus, the device being a mobile wireless device.

15. The apparatus of claim 13, wherein the of the media storage is less than the entire amount of media storage determined to be physically available for automatic filling.

16. The apparatus of claim 13, wherein providing a confidence level for each media file includes providing the confidence level for each media file using artifacts in metadata associated with the respective media file.

17. The apparatus of claim 13, wherein the instructions include:
applying a randomizing process to the categorized media files; and
selecting the media files to fill the media storage of the device based on the randomizing process.

18. The apparatus of claim 13, wherein the apparatus is configured as a mobile wireless device.

19. The apparatus of claim 13, wherein the apparatus is a stationary personal computer.

20. The apparatus of claim 13, wherein the apparatus is a stationary personal computer having a configuration including instrumentality to operate as a wireless server.

21. The apparatus of claim 13, wherein the instructions collecting data includes autonomously accessing the Internet from the system to collect a portion of the data on one or more of the media files from a site on the Internet, the site external to the system.

* * * * *